Oct. 27, 1959   W. FRANTZ   2,910,084
COMPUTER FOR AUTOMATIC CONTROLS
Filed Dec. 12, 1957

INVENTOR.
WILLIAM FRANTZ
BY Victor D. Behn
ATTORNEY

2,910,084
COMPUTER FOR AUTOMATIC CONTROLS

William Frantz, Englewood, N.J., assignor to Curtiss-Wright Corporation, a corporation of Delaware Application December 12, 1957, Serial No. 702,443

7 Claims. (Cl. 137—85)

This invention relates to automatic control systems and is particularly directed to the computer mechanism of such systems.

An object of the invention comprises the provision of a novel and simple computer mechanism of high accuracy and fast response particularly for use in automatic control systems. A further object of the invention comprises the provision of such a computer mechanism in which the output signal is a droopless function of one or more input signals. The output signal is such a "droopless" function if the magnitude of the output signal is independent of changes in the load against which the output signal works.

Other objects of the invention will become apparent upon reading the annexed detailed description in connection with the drawing.

Figure 1:
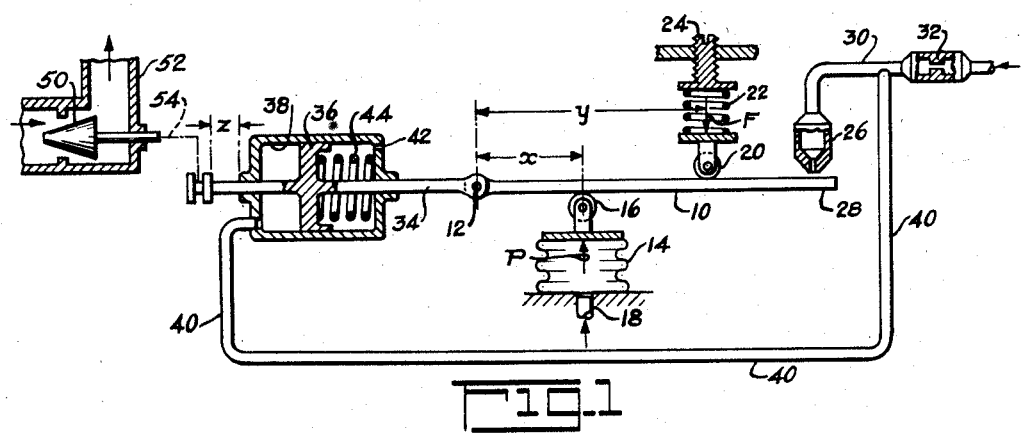
Fig. 1 is a schematic view of a computer mechanism embodying the invention.

Referring first to Fig. 1 of the drawing, the computer mechanism is illustrated as comprising a lever 10 having a fulcrum or pivotal support at 12. A bellows-type flexible diaphragm 14 has a roller 16 on its movable end for engagement with the lever 10 for exerting a force thereon. The bellows 14 is subjected to a fluid pressure supplied by a conduit 18, said pressure comprising a variable input signal. A second force is exerted on the lever 10 by a roller 20 and spring 22. The spring 22 is disposed between the roller 20 and an adjustable stop or nut 24. As illustrated the force of the bellows 14 exerts a counterclockwise turning moment on the lever 10 while the force of the spring 22 exerts a clockwise turning moment on said lever.

A nozzle 26 is disposed adjacent the end portion 28 of the lever 10 so that pivotal movements of said lever are effective to vary the discharge opening of said nozzle. A conduit 30 supplies a fluid under pressure to the nozzle 26. The conduit 30 has a fixed restriction 32 and the nozzle 26 with the cooperating portion 28 of the lever 10 comprises a variable restriction or discharge valve.

The pivotal support 12 for the lever 10 is connected to a piston rod 34 of a piston 36. The piston 36 is slidable in a cylinder 38 so that said piston and cylinder constitute a fluid motor connected to the pivotal support 12 of the lever 10 for moving said pivotal support relative to the lever force applying means 16 and 20 in a direction generally parallel to the longitudinal dimension of the lever. The fluid pressure in the conduit 30 between the restrictions 32 and nozzle 28 is transmitted by the conduit 40 to one end of the cylinder 30. The opposite end of the cylinder 38 is vented at 42 and a spring 44 opposes motion of the piston by the fluid pressure supplied by the conduit 40.

With the foregoing construction, the actual pivotal motion of the lever 10 between maximum and minimum open portions of the nozzle 26 is quite small. For example the actual range of movement of the lever portion 28 overlying the nozzle 26 may be of the order of only 0.001 inch. Hence, for practical purposes, the force exerted by the spring 22 may be considered constant.

If the input fluid pressure signal exerted by the bellows 14 increases, the lever 10 will pivot counterclockwise to effect a closing adjustment of the nozzle 26 whereupon the pressure in the conduit 40 will increase and the fluid motor piston 36 will move to the right to move the pivotal support 12 in a direction (to the right in Fig. 1) to decrease the moment arm of said bellows force as well as the moment arm of the force of the spring 22 until the lever 10 is again in balance. Since the moment arm of the bellows 14 is greater than that of the spring 22, this motion of the pivotal support 12 to the right results in the moment arm of the bellows 14 decreasing at a greater rate than that of the spring 22 so that the lever pivotal support 12 will reach a new position at which the turning moments acting on the lever are again in balance.

Similarly a decrease in the fluid pressure exerted by the bellows 14 is effective to cause an opening adjustment of the nozzle whereupon the fluid pressure supplied by the conduit 40 to the fluid pressure motor 36, 38 decreases and its piston moves to the left (Fig. 1) until the turning moments acting on the lever 10 are again in balance.

It is apparent therefore that the fluid motor 36, 38 automatically positions the pivotal support 12 of the lever 10 relative to the forces acting on said lever so that the turning moments exerted by said forces are in balance. This is so, within the limits of motion of the fluid motor 36, 38, regardless of variations in the fluid pressure supplied to the conduit 30 upstream of the restriction 32. This is also so regardless of the friction forces opposing motion of the lever pivotal support 12 as long as the fluid motor 36, 38 is capable of moving said pivotal support.

Assume now that, A is the effective area of the bellows 14 exerting a force on the lever 10, P is the fluid pressure input to the bellows 14, F is the force of the spring 22 against the lever and $x$ and $y$ are the moment arms of these forces as illustrated in Fig. 1. Then when the turning moments on the lever 10 are in equilibrium $$xAP = yF$$

or $$\frac{y}{x} = \frac{AP}{F}$$

Also Z, the displacement of the fluid motor piston 36, which is the same as the displacement of the pivotal support 12, is clearly a function of the ratio $y/x$. Accordingly, since A is a constant and, as previously stated F the spring force is also a constant, the output displacement Z of the fluid motor piston 36 is a function of the input pressure signal P and therefore said displacement Z can be used as the output signal. Inasmuch as the piston 36 always moves the lever pivotal support 12 to a position in which the turning moments on the lever 10 are in balance the displacement Z is a droopless function of the input pressure signal P.

It is possible to show that the change in the output signal Z resulting from a particular change in the input signal P depends on the magnitude of the spring force F. Hence the gain of the computer of Fig. 1 can be adjusted by a simple adjustment of the nut 24 to change the force F exerted by the spring 22 on the lever 10.

The output signal Z may be used for various purposes. As illustrated the piston 36 is connected to a valve 50 in a conduit 52 by means schematically indicated at 54 for controlling fluid flow through said conduit. As a specific example, the mechanism of Fig. 1 may form part of a fuel control system for a combustion engine. Thus the input signal P may be a measure of the air flow to the engine while the valve 50 controls the fuel flow to the engine as a function of said air flow signal.

Figure 2:
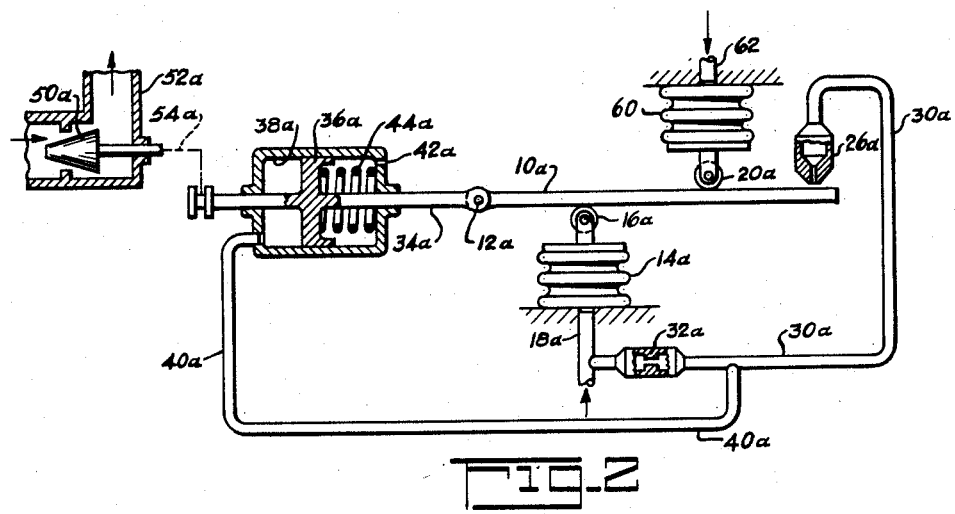
Fig. 2 is a view similar to Fig. 1 but illustrating a modified construction.

In Fig. 1 the system responds to but one input signal P. However the lever 10 may be subject to a plurality of input signals. Also instead of using a separate source of fluid pressure for the nozzzle and fluid motor, as in Fig. 1, if any of the input pressures is sufficient it could be used as the source of this pressure. Fig. 2 illustrates a system incorporating these features. For convenience of understanding, in Fig. 2 the parts corresponding to the parts of Fig. 1 have been designated by the same reference numerals as the corresponding parts of Fig. 1 but with a subscript $a$ added thereto.

In Fig. 2, the lever 10a is subject to the force exerted by the bellows 14a, the conduit 18a supplying an input fluid pressure signal to said bellows. The lever 10a is also subject to the force exerted by a second bellows 60. A conduit 62 supplies a second input pressure signal to the bellows 60. In Fig. 2 the fluid pressure supplied to the bellows 14a is also supplied to the nozzle 26a through the conduit 30a instead of using a separate source of fluid under pressure for the nozzle. As in Fig. 1 the conduit 30a includes a fixed restriction 32a. Also the conduit 40a, which supplies the fluid actuating pressure to the fluid motor 36a, 38a, is connected to the conduit 30a between the restriction 32a and the nozzle 26a whereby small pivotal movements of the lever 10a are effective to vary said fluid motor actuating pressure.

Fig. 2 is otherwise like Fig. 1. With the structure of Fig. 2, the output signal, as in Fig. 1, is the displacement of the piston 36a of the fluid motor 36a, 38a and it can readily be shown that this output signal is a function of the ratio of the two input pressure signals supplied to the bellows 14a and 60.

Like the control system of Fig. 1, the control system of Fig. 2 may be used for various purposes. For example the valve 50a of Fig. 2 may be used to control the fuel supply to a gas turbine engine with the bellows 60 and 14a being supplied with the inlet and discharge pressure respectively of the gas turbine engine compressor. With such an arrangement the output signal would be a measure of the pressure difference across the compressor of the gas turbine engine.

Figure 3:
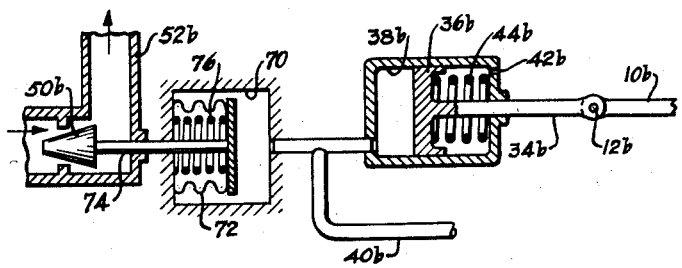
Fig. 3 is a view illustrating a further modification.

In Fig. 2, if the force of the spring 44a opposing motion of the piston 36a by the fluid pressure supplied by the conduit 40a is large compared with the friction forces opposing motion of said piston then said fluid pressure is substantially proportional to the displacement of the piston. This is also true in Fig. 1. When this is the case said fluid pressure can be used as the output signal in addition to or in lieu of the displacement of the fluid motor piston. Such an arrangement is illustrated in Fig. 3. In Fig. 3, the parts corresponding to the parts of Figs. 1 and 2 have been designated by the same reference numerals but with a subscript $b$.

In Fig. 3 a sealed chamber 70 is disposed in communication with the passage 40b supplying fluid actuating pressure to the fluid motor 36, 38. A flexible bellows 72 is disposed in the chamber 70 with one end of the bellows being secured to a wall of said chamber. The free end of the bellows 72 is connected by a rod 74 to a valve 50b in a conduit 52b. The valve 50b is urged in one direction by the fluid pressure in the chamber 70 acting on the bellows 72 and this motion is opposed by a spring 76. Thus in Fig. 3 the fluid pressure for actuating the fluid motor 36b, 38b functions as the output signal for controlling the valve 50b in lieu of the motion of the fluid motor piston 36b.

In all of the above forms of the invention the pivotal support of the lever is adjustable relative to the forces applied to said lever to vary the moment arms of said forces. As illustrated, any adjustment of the lever pivotal support, for example 12 in Fig. 1, is accompanied by actual displacement of the entire lever 10. Obviously, however, it is not necessary to move the entire lever. It is only essential that the lever pivotal support be movable in a direction longitudinally of the lever. Thus in Fig. 1, instead of the fluid motor 36, 38 moving the entire lever 10 along with its pivotal support 12, said lever pivotal support could comprise a movable fulcrum which is adjustable longitudinally along the lever to vary the moment arms of the forces acting on said lever.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A fluid pressure mechanism for providing an output signal which is a function of at least one variable input force; said mechanism comprising a lever; means providing a pivotal support for said lever; means for applying first and second forces against said lever of different moment arms and disposed so as to exert opposite turning moments against said lever, at least one of said forces constituting a variable input signal; means providing a source of fluid pressure; a fluid motor having a movable member connected to said pivotal support for moving said pivotal support relative to said force applying means and in a direction longitudinally of said lever in response to changes in said fluid pressure; valve means controlled by pivotal movement of said lever in response to unbalance of the turning moments acting thereon for regulating said fluid pressure so as to cause said fluid motor to move said lever pivotal support to a position in which the turning moments acting on said lever are balanced; and means responsive to a condition indicative of the position of said fluid motor movable member for providing an output signal which is a function of said input signal.

2. A fluid pressure mechanism as recited in claim 1 in which said condition is the motion of said fluid motor means.

3. A fluid pressure mechanism as recited in claim 1 in which said condition is said fluid pressure.

4. A fluid pressure mechanism as recited in claim 1 in which said valve means comprises a fluid discharge nozzle and means movable with pivotal movements of said lever for varying the discharge opening of said nozzle.

5. A fluid pressure mechanism as recited in claim 1 in which both said forces constitute variable input signals.

6. A fluid pressure mechanism as recited in claim 1 in which one of said forces is a variable input signal and the other of said forces is an adjustable spring force.

7. A fluid pressure mechanism for providing an output signal which is a function of at least one input variable; said mechanism comprising a lever; means for applying first and second forces against said lever of different moment arms and disposed to exert opposite turning moments against said lever, one of said force applying means constituting a variable fluid pressure input signal and a flexible diaphragm subject to said fluid pressure and applying a force proportional to said fluid pressure against said lever; a fluid motor having a movable member connected to said pivotal support for moving said pivotal support relative to said force applying means and in a direction longitudinally of said lever in response to changes in a second fluid pressure derived from said first-mentioned fluid pressure; valve means controlled by pivotal movement of said lever in response to unbalance of the turning moments acting thereon for regulating said second fluid pressure so as to cause said fluid motor to move said lever pivotal support to a position in which the turning moments acting on said lever are balanced; and means responsive to a condition indicative of the position of said fluid motor movable member for providing an output signal which is a function of said input signal.

References Cited in the file of this patent

UNITED STATES PATENTS

| | | |
|---|---|---|
| 2,521,477 | Pellettere | Sept. 5, 1950 |
| 2,637,334 | Starkey | May 5, 1953 |
| 2,643,055 | Surteberg | June 23, 1953 |
| 2,675,818 | Gallo | Apr. 20, 1954 |
| 2,736,199 | Ibbott | Feb. 28, 1956 |